US007076461B2

(12) United States Patent
Balabon (10) Patent No.: US 7,076,461 B2
(45) Date of Patent: Jul. 11, 2006

(54) SYSTEM AND METHOD FOR TRADING ABOVE OR BELOW THE MARKET (76) Inventor: Sam Balabon, 7934 S. Wellington Ct., Houston, TX (US) 77055-3511

( * ) Notice: Subject to any disclaimer, the term of this patent is extended or adjusted under 35 U.S.C. 154(b) by 0 days.

(21) Appl. No.: 10/730,360

(22) Filed: Dec. 9, 2003

(65) Prior Publication Data
US 2004/0177026 A1    Sep. 9, 2004

Related U.S. Application Data (60) Provisional application No. 60/431,913, filed on Dec. 9, 2002.

(51) Int. Cl.
    G06F 15/18    (2006.01)
(52) U.S. Cl. .......................... 705/37; 705/35
(58) Field of Classification Search ............... 705/37, 705/35
    See application file for complete search history.

(56) References Cited

U.S. PATENT DOCUMENTS

| 6,405,180 | B1 * | 6/2002 | Tilfors et al. ............. 705/37 |
| 6,408,282 | B1 * | 6/2002 | Buist ..................... 705/36 R |
| 6,594,643 | B1 * | 7/2003 | Freeny, Jr. ............... 705/37 |
| 6,618,707 | B1 * | 9/2003 | Gary ....................... 705/37 |
| 6,850,907 | B1 * | 2/2005 | Lutnick et al. ............ 705/37 |
| 2001/0044767 | A1 * | 11/2001 | Madoff et al. ............ 705/37 |
| 2002/0161693 | A1 * | 10/2002 | Greenwald .............. 705/37 |
| 2003/0216932 | A1 * | 11/2003 | Foley ...................... 705/1 |
| 2004/0030632 | A1 * | 2/2004 | Hausman ................. 705/37 |
| 2004/0059666 | A1 * | 3/2004 | Waelbroeck et al. ....... 705/37 |
| 2004/0177024 | A1 * | 9/2004 | Bok et al. ................. 705/37 |

FOREIGN PATENT DOCUMENTS

JP    2002117232 A  *  4/2002
WO    WO 00/70520    * 11/2000

OTHER PUBLICATIONS

PhD dissertation of Patrick Conroy entitled, "Limit Orders Versus Market Orders: Theory and Evidence," published in vol. 59/02-A of Dissertation Abstracts International, 1997, p. 572.*
Trade Throughs for Simpletons? (Trends), Traders Magazine, Jun. 1, 2004.*
Chapman, Peter, Pooling Fragmented Market Liquidity: Vendor's Buyside and Sellside Approach (Lava Tading markets technology that consolidates every limit order and quote found in Nasdaq montage onto single screen), Trader Magazine, Jul. 2001.*

(Continued)

Primary Examiner—Jagdish Patel
Assistant Examiner—James M. Alpert
(74) Attorney, Agent, or Firm—Kenyon & Kenyon LLP (57) ABSTRACT A method and system for trading above or below the market. According to one embodiment, a trading system receives from a first party an order to trade a financial instrument at a predetermined distance and predetermined direction away from a market value of the financial instrument, determines an updated market value of the financial instrument upon acceptance of the order by a second party at a particular price, and completes the order only if the accepted price is at least the predetermined distance and the predetermined direction away from the updated market value.

35 Claims, 7 Drawing Sheets

OTHER PUBLICATIONS

Securities and Exchange Commission (Release No. 34-52418), Self-Regulatory Organizations; International Securities Exchange, Inc.; Order Approving a Proposed Rule Change to Amend the Exchange's Trade-Through and Locked Markets Rules, Sep. 13, 2005.*

Benveniste et al., *What's special about the specialist?*, Journal of Financial Economics, 1992, pp. 61-86.

Mobilepro Corp., *Annual Report Under Section 13 or 15(d) of the Securities Exchange Act of 1934*, Commission File No. 002-97869-D, U.S. Security and Exchange Commission, available at <<http://www.sec.gov/Archives/edgar/data/769592/000114420404009233/v04223_10-ksb.htm>>.

"Researchers Study the Cost of Conducting Trades in Financial Markets", Stanford Business School, Mar. 1995, http://www.gsb.stanford.edu/research/faculty/news_releases/peter.reiss/werner.htm (printed Nov. 3, 2003).

Ljungqvist, Alexander P. et al., "Hot Markets, Investor Sentiment, and IPO Pricing", Nov. 6, 2003, AFA 2004 San Diego Meetings; Twelfth Annual Utah Winter Finance Conference; Texas Finance Festival; posted Nov. 2, 2003 at http://papers.ssrn.com/sol3/papers.cfm?abstract_id=282293.

Brown, David P. et al., "Adjustable Limit Orders", Mar. 15, 2002, posted Jun. 1, 2000 at http://www.kelley.iu.edu/Finance/wp3.htm.

Web Pages for "Order Types Available on RealTick ©" at http://www.terranovaonline.com/TNO_Forms/PDF_Forms/RT_OrderTypes.pdf.

Schmerken, Ivy, "New Kids on the Block", Mar. 26, 2004, Wall Street & Technology Online, available at http://www.wallstreetandtech.com/showArticle.jhtml?articleID=18402829.

* cited by examiner

SYSTEM AND METHOD FOR TRADING ABOVE OR BELOW THE MARKET

CROSS REFERENCE TO RELATED APPLICATIONS

This application claims the benefit under 35 U.S.C. § 119(e) of U.S. Provisional Application No. 60/431,913, filed Dec. 9, 2002.

BACKGROUND OF THE INVENTION

It is well known that if buyers or sellers want to trade a large quantity of stock that is disproportional to the stock's average trading volume, the buyers or sellers will pay a premium to the market price of the stock in order to execute the trade. This premium is exacerbated by current methods used to trade large orders of stock.

Currently there are many market participants, such as broker/dealers, specialists and hedge funds, who use quantitative analysis to value securities; they constantly scan the market for trading opportunities. In some respects, these types of traders are the wholesalers of the stock market. For example, where a mutual fund may feel they must dump a security after a bad earnings report, a broker/dealer, specialist or hedge fund may use a historical trading model to show an opportunity in acquiring the same security, thus providing liquidity to the market place and receiving a discount on the price of the security. Alternatively, a mutual fund may feel they must acquire a security after a good earnings report, thus pushing the security price up and providing a shorting opportunity for a broker/dealer, specialist or hedge fund. These current methods to receive a discount on the purchasing of securities and the shorting of inflated priced securities are inefficient because of the inherent risks involved with trading against short-term momentum of the securities.

With a large market order, for example, the broker/dealer or specialist and not the trader determines the price of execution. In some cases the broker/dealer or specialist has its own interest in the trade, but in most cases the automated systems that the broker/dealer or specialist uses to match buyers and sellers are simply inefficient and result in poor executions, leading to higher costs to traders.

Large limit orders posted on the NYSE (New York Stock Exchange), for example, attract traders who want to execute smaller orders with slightly improved prices in front of the larger order. The trader of the smaller order uses the larger order to provide a hedge or a barrier to protect the smaller order. The larger order gets hurt because the shares that should go to fill the larger order get rerouted to fill the smaller order. This increases the costs for traders who trade large orders.

Additionally, when traders place limit orders to buy they put themselves at risk for the possibility of a negative market moving event. If a negative market moving event occurs and the market falls sharply, many of the buy limit orders will be executed. If the buyers had information of such an event beforehand, they would have canceled their orders. By not having outstanding buy limit orders canceled and repriced to reflect the negative market moving event, the execution of these orders results in securities being purchased at inflated prices and, thus, trading losses.

Institutional investors invest large amounts of money in securities. They make their money charging fees on the amounts of money they manage, and they usually trade in large quantities of securities. Institutional investors can either buy securities in the open market or they can negotiate though intermediaries. When institutional investors buy large quantities of securities in the open market, they end up paying a premium above the current market value of the securities because they upset the market price in those securities. This is due to an increase in their acquisition costs because large quantities of securities usually cannot be bought in the open market with a single order, but rather with several manageable smaller orders resulting in multiple commissions and slippage (moving prices higher while attempting to acquire securities). When institutional investors use intermediaries, they are limited to a small pool of other institutional investors that use the same intermediary. So even if they are able to negotiate a trade using an intermediary, the price may not be to the advantage of the institutional investor. They also run the risk of letting the word out on the street that a large buyer is seeking to trade a particular security; this information leak can increase the acquisition costs for institutional investors.

Accordingly, there is a need in the art for a system and method that allows traders to reduce the risks of purchasing securities at discounted prices and reduce the risks of selling short securities at inflated prices, as well as a need to reduce the negative price impact currently associated with the trading of large orders, as well as a need to reduce trading losses due to market moving events.

SUMMARY OF THE INVENTION

Embodiments of the present invention provide for trading above or below the market. According to one embodiment, a trading system receives from a first party an order to trade a financial instrument at a predetermined distance and predetermined direction away from a market value of the financial instrument, determines an updated market value of the financial instrument upon acceptance of the order by a second party at a particular price, and completes the order only if the accepted price is at least the predetermined distance and the predetermined direction away from the updated market value.

A trading system according to the present invention provides a marketplace where buyers and sellers of financial instruments can receive guaranteed discounts or premiums on the financial instruments they trade. Such a system provides better executions for large blocks of stock, such as discounting into one trade the price improvement of trading in small lots over time, while allowing users to advertise large orders without upsetting the market. This increases liquidity in financial markets for financial instruments such as stocks, bonds, contracts, options, futures, commodities, currencies, etc.

DETAILED DESCRIPTION

Overview

Figure 1:
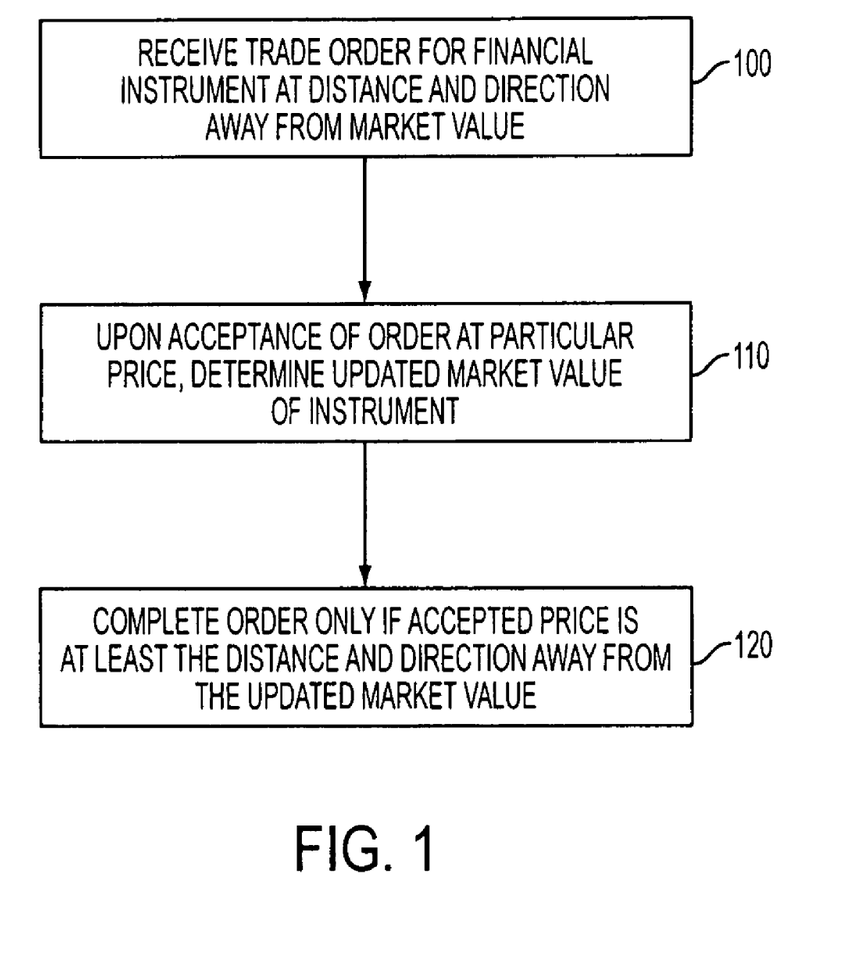
FIG. 1 is a flow chart that depicts a process for implementing above/below market trading in accordance with an embodiment of the present invention.

FIG. 1 depicts a process for implementing above/below market trading in accordance with an embodiment of the present invention. A trading system receives an order to trade a financial instrument at a predetermined distance and direction away from the instrument's market value (step 100). Upon acceptance of the order at a particular price, the trading system determines the updated market value of the instrument (step 110), and completes the order only if the accepted price is at least the predetermined distance and direction away from the updated market value (step 120).

By executing orders at a specified discount, for example, and therefore outside market value, the party who enters the order into the trading system receives a discount to the current market value of the financial instrument, while the party who accepts the order posted by the trading system pays a premium above the current market value of the instrument. This is different to the current operation of limit orders in the open market, for example, which only execute once the market value of the underlying instrument reaches a specific price.

The trading system of the present invention creates a new form of liquidity for markets by taking advantage of the difference between the short term and long term liquidity values of financial instruments. The system allows the market to determine the value of this difference in the form of a discount, which is effectively converted into a tradable spread. This spread is much like the difference between the bid and ask prices of current trading systems.

Taking an example, assume that a stock S is trading at $10/share (a current market value of the share) and it can absorb only 500 share blocks without significantly affecting the market. Further assume that there is a broker/dealer interested in buying 50,000 shares of S providing she can buy it at a 2.5% discount (25 cents/share) lower than the market price of the stock which is constantly changing and is currently trading at $10/share. The broker/dealer estimates over the next three days she will be able to sell the shares at an average price of $9.80/share, thus realizing a profit of $0.05 cents a share or $2500.

However, to explore the possibility of finding a seller, the broker/dealer places an order to buy 50,000 shares of S pegged at $0.25 lower than the current trading price of stock S.

A mutual fund wants to sell 50,000 shares of S, and estimates that if she places a market order to sell, she will realize an average execution price of $9.70/share. Thus, the estimated loss for the seller would be $15,000 ($0.3/share*50,000 shares). The buyer sees the seller's order and estimates by accepting the price of $9.75 she will save $0.05/share or ($0.05*50,000) $2500 and thus reduce her selling costs to liquidate 50,000 shares of S from $15,000 to $12,500.

The mutual fund sees the posted order of the broker/dealer and accepts the price of $9.75 per share of S. In this instance both the broker/dealer and mutual fund receive a price improvement of $0.05 a share on the execution using the system. These price improvements are because of the inefficiency of current trading systems.

Figure 2:
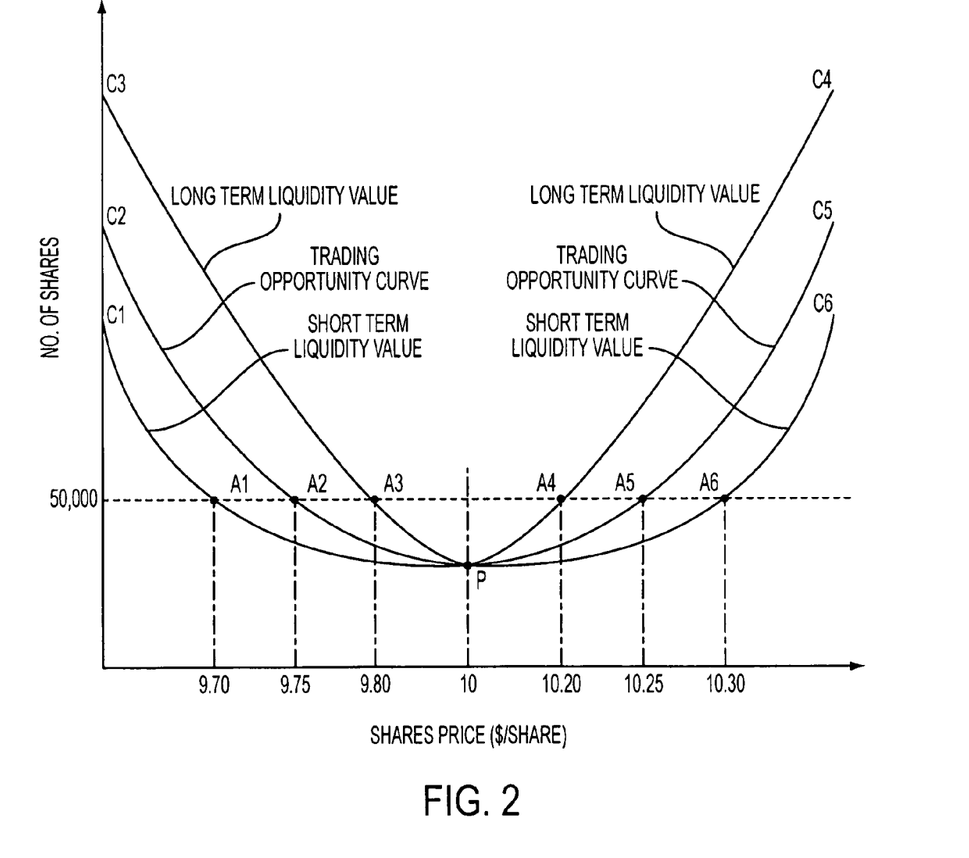
FIG. 2 is a graphical representation of positioning above/below market trade orders in accordance with an embodiment of the present invention.

FIG. 2 demonstrates this positioning of liquidity in a graphical form. Assume curves C1, C2 and C3 represent the following:

C1: Short term liquidity value
C2: Trading opportunity curve
C3: Long term liquidity value A1, A2 and A3 are three points on the curves C1, C2 and C3, respectively. Further assume the following values for these points:

| | |
|---|---|
| A1 = $9.70 | Estimated execution price of 50,000 share block if liquidated immediately on the open market. |
| A2 = $9.75 | Estimated trading opportunity for both parties. |
| A3 = $9.80 | Estimated execution price of 50,000 share block if liquidated in smaller lots over time on the open market. |

The current trading price (i.e., market value) for a financial instrument is $10/share, shown as point P on the graph of FIG. 2.

At point A2, both a buyer and seller agree to trade the 50,000 share block. The buyer measures her ability to make a profitable trade using long term liquidity curve C3 while the seller uses her ability to make a profitable trade using the short term liquidity curve C1. The buyer observes that the 50,000 shares traded at point A2 ($9.75/share) are worth the amount at point A3 ($9.80/share) based on long term liquidity curve C3. The seller observes that the 50,000 shares traded at point A2 ($9.75/share) are worth the amount at point A1 ($9.70/share) based on the short term liquidity curve C1. So it can be seen that the trading opportunity curve C2 provides an opportunity for both the buyer and the seller to make a profitable trade.

The profit and loss conditions for the party that posts the buy limit order (advertiser) can be summarized as follows:

profit when: (1−% discount)*current value/future estimated value<1 loss when: (1−% discount)*current value/future estimated value>1        Equation 1

The future estimated value is the price at which the buyer thinks she would be able to sell the stock after buying it at a % discount to the current market value. Based on this example, if the advertiser buys the stock at a 2.5% discount to the current value ($10/share) and estimates the future value at $9.80/share, she would make a profit. Based on this data the buyer's equation above (Equation 1) equals 0.995, which is less than 1 which indicates profit [(1−0.025)*$10/$9.80>1].

The profit and loss conditions for the seller that accepts the buy limit order can be summarized as follows:

profit when: estimated liquidation cost/discount>1 loss when: estimated liquidation cost/discount<1        Equation 2

As a further example, assume that a stock S is trading at $10/share (a current market value of the share) and it can absorb only 500 share blocks without significantly affecting the market. Further assume that there is a broker/dealer interested in selling short 50,000 shares of S providing she can sell short at a 2.5% premium (25 cents/share) higher than the market price of the stock which is constantly changing and is currently trading at $10/share. The broker/ dealer estimates over the next three days she will be able to buy back the shares at an average price of $10.20/share, thus realizing a profit of $0.05 cents a share or $2500. However, to explore the possibility of finding a buyer, the broker/dealer places an order to sell 50,000 shares of S pegged at $0.25 higher than the current trading price of stock S.

A mutual fund wants to buy 50,000 shares of S, and estimates that if she places a market order to buy, she will realize an average execution price of $10.30/share. Thus, the estimated loss for the buyer would be $15,000 ($0.3/share*50,000 shares). The buyer sees the seller's order and estimates by accepting the price of $10.25 she will save $0.05/share or ($0.05*50,000) $2500 and thus reduce her acquisition cost of 50,000 shares of S from $15,000 to $12,500.

The mutual fund sees the posted order of the broker/dealer and accepts the price of $10.25 per share of S. In this instance both the broker/dealer and mutual fund receive a price improvement of $0.05 a share on the execution using the system. These price improvements are because of the inefficiency of current trading systems.

FIG. 2 further demonstrates this positioning of liquidity in a graphical form. Assume curves C4, C5 and C6 represent the following:

C6: Short term liquidity value
C5: Trading opportunity curve
C4: Long term liquidity value A4, A5 and A6 are three points on the curves C4, C5 and C6, respectively. Further assume the following values for these points:

| | |
|---|---|
| A6 = $10.30 | Estimated execution price of 50,000 share block if liquidated immediately on the open market. |
| A5 = $10.25 | Estimated trading opportunity for both parties. |
| A4 = $10.20 | Estimated execution price of 50,000 share block if liquidated in smaller lots over time on the open market. |

The current trading price (i.e., market value) for a financial instrument is $10/share, shown as point P on the graph of FIG. 2.

At point A5, both a buyer and seller agree to trade the 50,000 share block. The seller measures her ability to make a profitable trade using long term liquidity curve C4 while the buyer uses her ability to make a profitable trade using the short term liquidity curve C6. The seller observes that the 50,000 shares traded at point A5 ($10.25/share) are worth the amount at point A4 ($10.20/share) based on long term liquidity curve C4. The buyer observes that the 50,000 shares traded at point A5 ($10.25/share) are worth the amount at point A6 ($10.30/share) based on the short term liquidity curve C6. So it can be seen that the trading opportunity curve C5 provides an opportunity for both the buyer and the seller to make a profitable trade.

The profit and loss conditions for the party that posts the sell limit order (advertiser) can be summarized as follows:

profit when: (1+% premium)*current value/future estimated value>1 loss when: (1+% premium)*current value/future estimated value<1      Equation 3

The future estimated value is the price at which the seller thinks she would be able to buy back the stock after selling it for the % premium to the current market value. Based on this example, if the advertiser sells the stock at a 2.5% premium to the current value ($10/share) and estimates the future value at $10.20/share, she would make a profit. Based on this data the seller's equation above (EQUATION 3) equals 1.005, which is greater than 1 which indicates profit [(1+0.025)*$10/$10.20>1].

The profit and loss conditions for the buyer that accepts the sell limit order can be summarized as follows:

profit when: estimated cost of purchase/premium>1 loss when: estimated cost of purchase/premium<1      Equation 4

The trading system of the present invention also allows a trader to approve execution conditions before accepting a limit order, thus approving the allowance of a safety measure that reduces trading costs for those who place limit orders into the system.

Architecture

Figure 3:
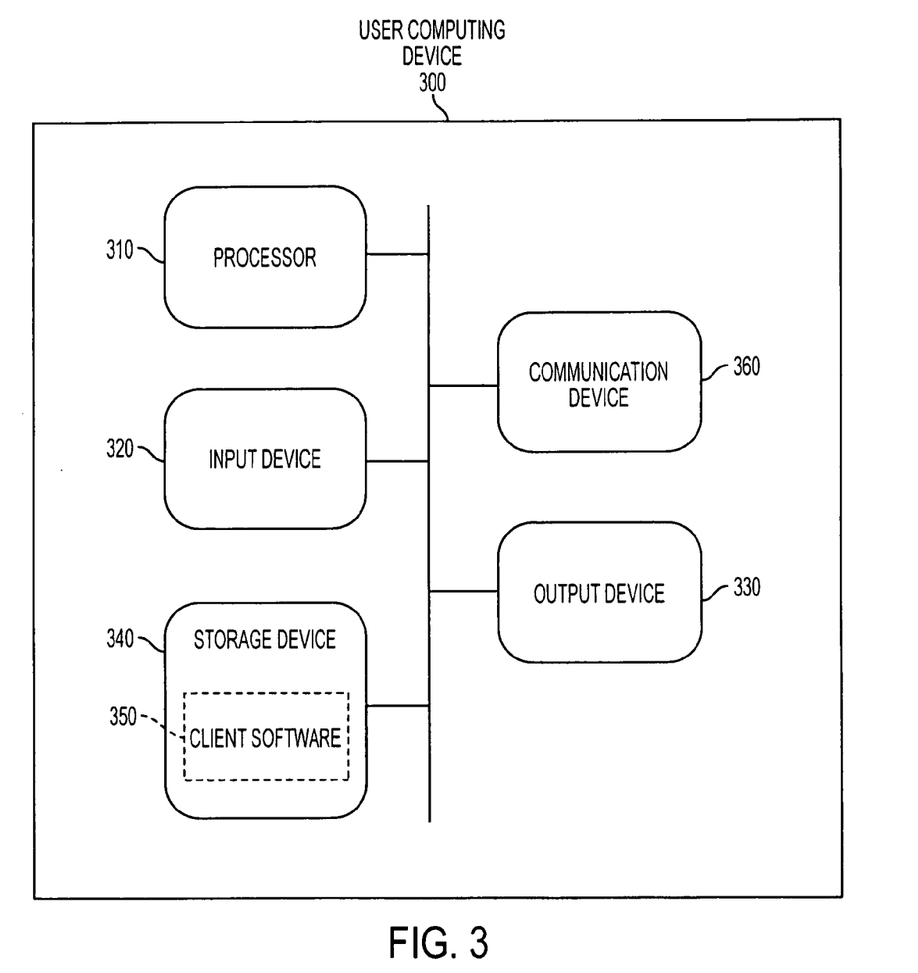
FIG. 3 is a block diagram that depicts a user computing device in accordance with an embodiment of the present invention.
Figure 4:
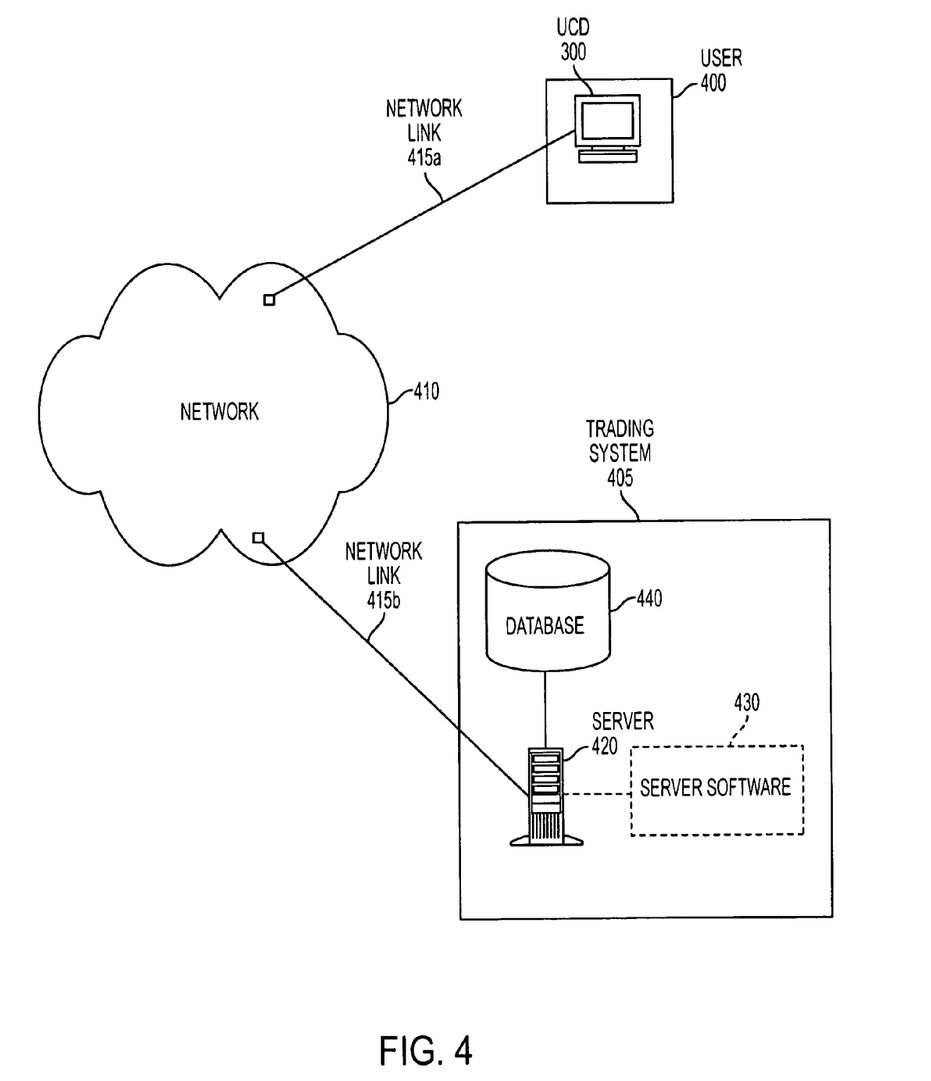
FIG. 4 is a block diagram that depicts a system architecture for above/below market trading in accordance with an embodiment of the present invention.

FIGS. 3 and 4 illustrate the components of a basic computer and network architecture in accordance with an embodiment of the present invention. FIG. 3 depicts user computing device 300, which may be a personal computer, workstation, handheld personal digital assistant ("PDA"), or any other type of microprocessor-based device. User computing device 300 may include a processor 310, input device 320, output device 330, storage device 340, client software 350, and communication device 360.

Input device 320 may include a keyboard, mouse, pen-operated touch screen or monitor, voice-recognition device, or any other device that accepts input. Output device 330 may include a monitor, printer, disk drive, speakers, or any other device that provides output.

Storage device 340 may include volatile and nonvolatile data storage, including one or more electrical, magnetic or optical memories such as a RAM, cache, hard drive, CD-ROM drive, tape drive or removable storage disk. Communication device 360 may include a modem, network interface card, or any other device capable of transmitting and receiving signals over a network. The components of user computing device 300 may be connected via an electrical bus or wirelessly.

Client software 350 may be stored in storage device 340 and executed by processor 310, and may include, for example, web browser software or the client side of client/server software that implements the functionality of the present invention.

FIG. 4 illustrates a network architecture in accordance with an embodiment of the present invention. The network architecture allows user 400 to access trading system 405, embodying the above/below market trading functionality of the present invention through server software 420, on user computing device 300 through network 410.

Network links 415 may include telephone lines, DSL, cable networks, T1 or T3 lines, wireless network connections, or any other arrangement that implements the transmission and reception of network signals. Network 410 may include any type of interconnected communication system, and may implement any communications protocol, which may secured by any security protocol.

In one particular embodiment, trading system 405 may be an ECN ("Electronic Communication Network") embodying the functionality of the present invention. Server 420 includes a processor and memory for executing program instructions, as well as a network interface, and may include a collection of servers, such as an application server and a database server. Database 440 may represent a relational or object database, and may be accessed via server 420.

User computing device 300 and server 420 may implement any operating system, such as Windows or UNIX. Client software 350 and server software 430 may be written in any programming language, such as C, C++, Java or Visual Basic.

Example Embodiment

Figure 5:
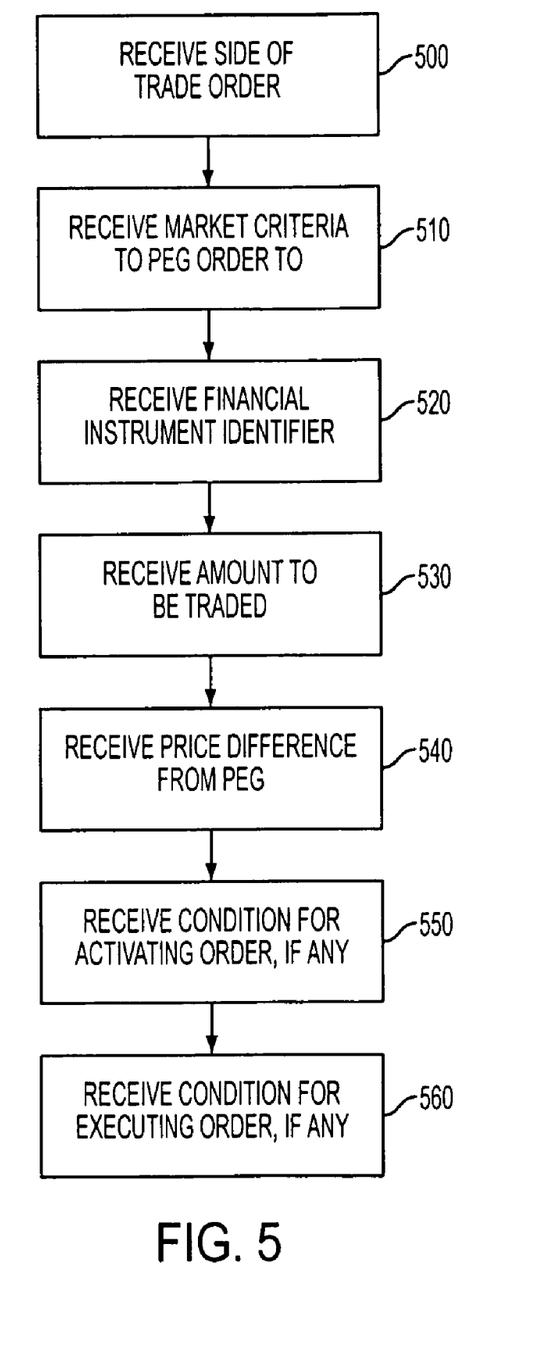
FIG. 5 is a flow chart that depicts order entry to a above/below market trading system in accordance with an embodiment of the present invention.

FIG. 5 depicts order entry to trading system 405 from a buyer or seller (e.g., user 400) in accordance with an embodiment of the present invention. In step 500, trading system 405 receives the side of a trade order, such as "buy" or "sell". In step 510, the system receives market criteria for calculating the market value to which the order will be pegged. This market criteria includes the bid, ask, midpoint of bid and ask, number of shares at a better price, last trade, trailing averages and any other formula that uses active market data to determine a price. The bid, ask and midpoint may include those prices determined by the NBBO (National Best Bid and Offer).

The system then receives an identifier for the financial instrument to be traded (step 520), along with the amount to be traded (step 530). When using trading system 405 in the stock market, for example, the identifier and amount may include the symbol and number of shares of a stock, respectively. Trading system 405 may accept and trade orders for any financial instrument, including stocks, bonds, contracts, options, futures, commodities and currencies.

In step 540, the system receives the price difference from the pegged market value upon which the order may execute. This difference may be entered as a percentage or dollar amount, for example.

If user 400 desires to specify additional conditions for activating and/or executing the order, trading system 405 may receive such conditions in steps 550 and 560, respectively. These conditions are generally based on stable market data so that user 405 may insure against sudden price declines or surges. Order activation conditions may include, for example, activating the order only if the market value of the instrument remains unchanged for a particular interval of time (e.g., 15 seconds), or activating the order only on a one-minute up tick on a particular market index, such as the Dow Jones Industrial Average, NASDAQ composite index, etc. Order execution conditions may include, for example, completing the order only if a particular market index increases during a particular interval of time (e.g., one minute) after the order is accepted, completing the order only if the market value of the instrument remains unchanged for a particular interval of time (e.g., a random period between 15–45 seconds) or any other formula that uses active market data to determine a market condition of execution.

The following represents a possible user interface screen that may be presented to user 400 for entering order information:

1. Please enter:
   A. Buy
   B. Sell
2. Please enter what you want your order pegged to:
   A. Bid
   B. Ask
   C. Midpoint of bid and ask
   D. Last trade
   E. Custom Peg [see advanced features]
3. Please enter the symbol:
4. Please enter the number of shares to be traded:
5. Please enter the price or percentage difference from your peg:
6. Do you want a condition to activate your order? If so, choose:
   A. Activate my order only on a 1-minute up tick on the DJIA index.
   B. Activate my order only if the bid price remains unchanged for 15 seconds.
   C. Activate my order based on my own market criteria see advanced features.
7. Do you want a condition to execute your order? If so, choose:
   A. Execute my order only if 1 minute after the initial match the DJIA index increases in that minute.
   B. Execute my order only if after the initial match, the bid price remains unchanged for a random time period between 15–45 seconds.
   C. Execute my order based on my own market criteria see advanced features.

After trading system 405 receives the order, it is placed for public display. In one embodiment, the order may be posted on a web-accessible site over network 410, with each listing provided in a bulletin board type fashion. The system may choose to display limited information about the order to the public, such as the identity and amount of the order's underlying instrument, along with the distance from market value required to execute the order and any other execution conditions, if specified. Additionally, trading system 405 may allow user 400 to hide their order entirely, or show only a portion of their order.

Once the order is displayed, it may be accepted only if activated (i.e., made available for trading). Trading system 405 may indicate that an order is available for trading by, for example, associating a particular color with the posted order. In one embodiment, if an order is colored green, it is active (i.e., available for trading); if the order is colored gray, then the order is inactive (i.e., not available for trading)—potentially due to non-satisfaction of an activation condition.

Figure 6:
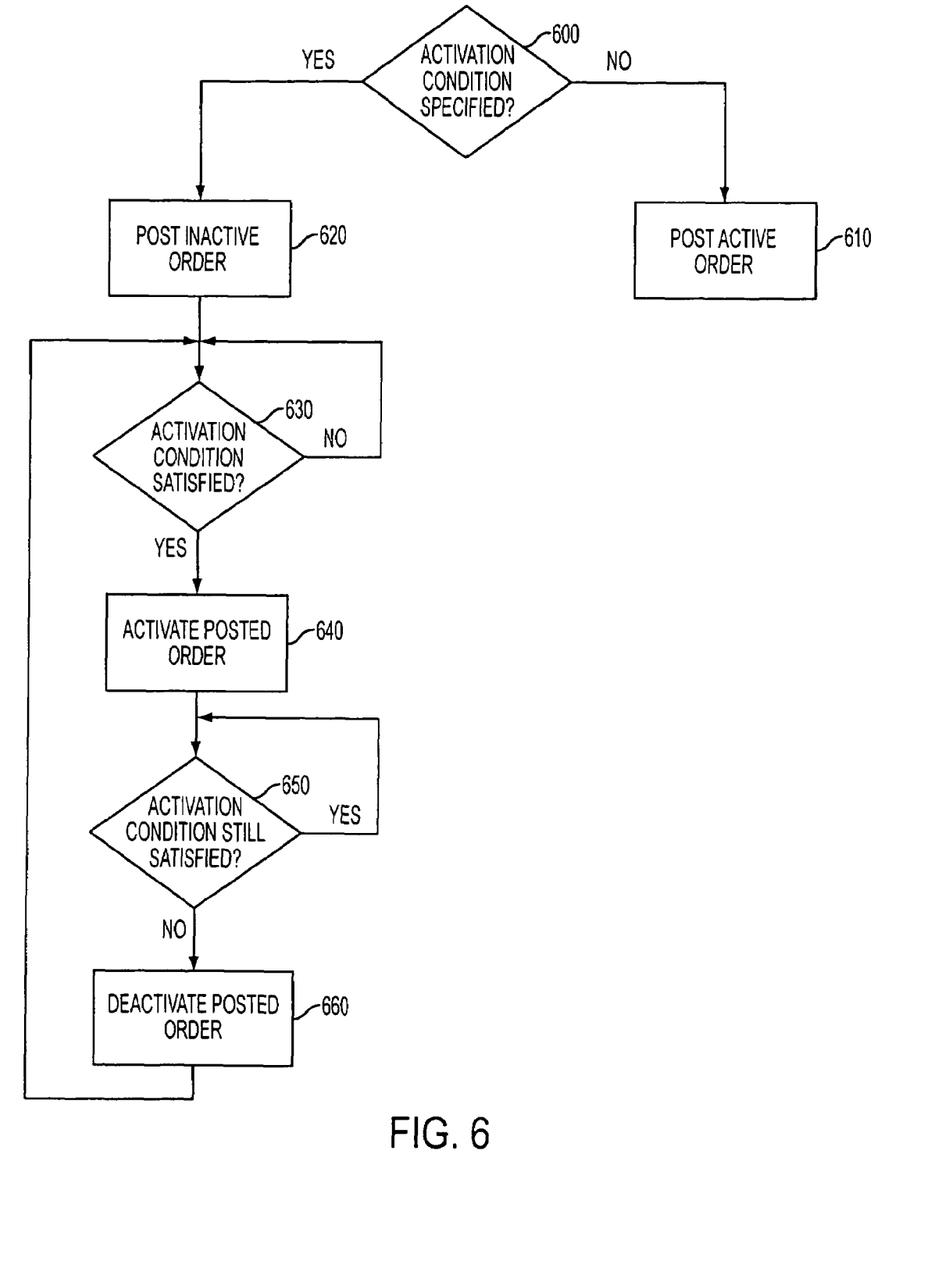
FIG. 6 is a flow chart that depicts activation of above/below market trades in accordance with an embodiment of the present invention.

FIG. 6 depicts an activation scenario in accordance with an embodiment of the present invention. If no activation conditions were specified with an order (step 600), then trading system 405 posts an active order (step 610). However, if activation conditions were specified, then the system posts an inactive order (step 620) until all activation conditions are satisfied (step 630). Once satisfied, the system activates the posted order (step 640) while the activation conditions remain satisfied (step 650). If they do not remain satisfied, the order is deactivated (step 660) until the activation conditions become satisfied again.

An order posted by trading system 405 (whether active or inactive) may list the offered buy or sell price in different ways, such as by percentage (i.e., percentage discount off the current market value), a price differential (i.e., distance in monetary amount away from current market value), or the actual offered buy/sell price. For this last display method, trading system 405 may periodically (e.g., several times per minute) update the offered buy/sell price by scanning the current market price to which the order is pegged (using third party market scanning software in one embodiment), and subtracting/adding the specified distance from that market value for display.

Embodiments of trading system 405 are not limited in the ways in which an order may be accepted. In one embodiment, a user may accept a posted order by clicking on it. In another embodiment, a user may enter an order on the opposite side of an existing order in the system, and the system will automatically match the two orders (if conforming), resulting in acceptance. Users of trading system 405 may be registered with the system, and be required to enter user identification and passwords for authentication.

Figure 7:
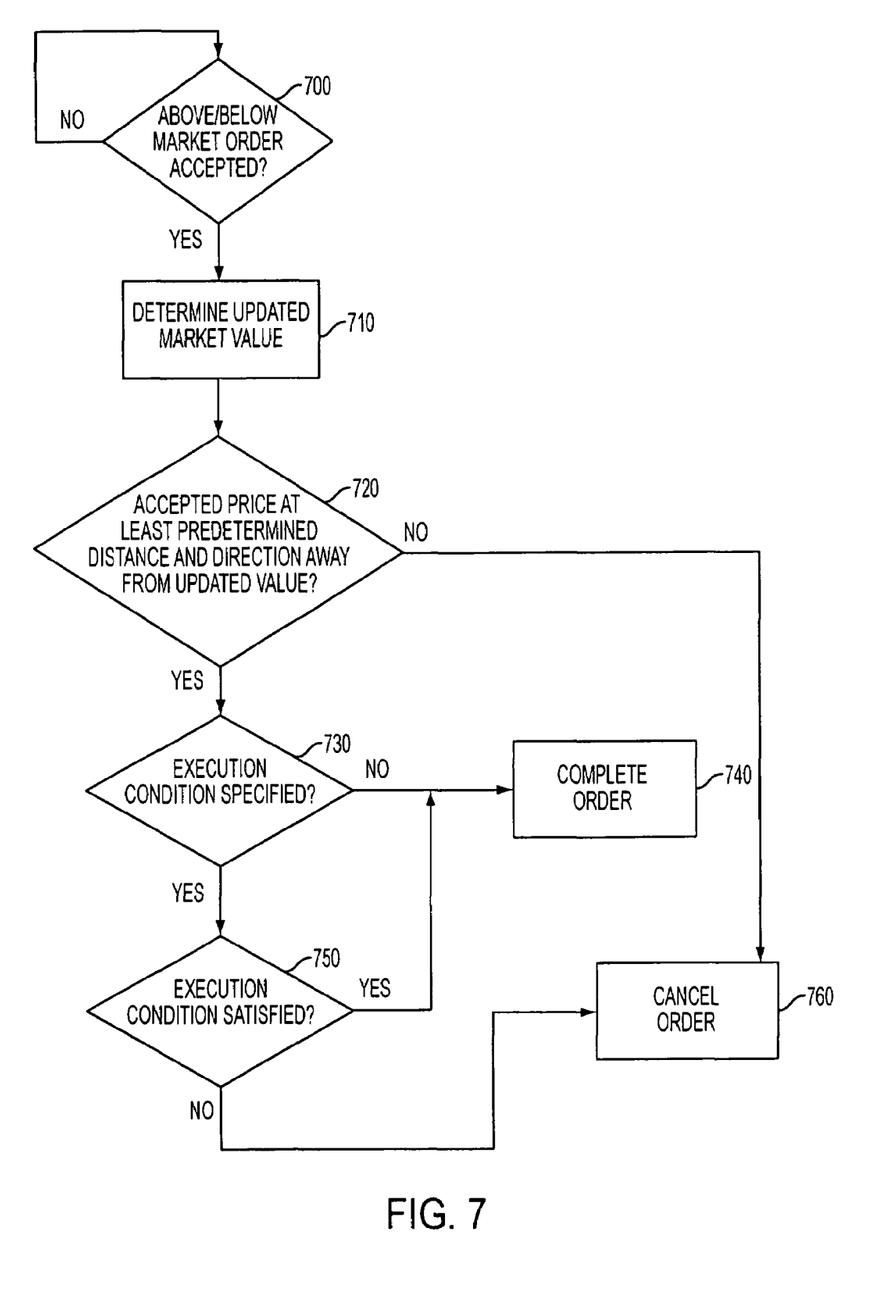
FIG. 7 is a flow chart that depicts execution of above/below market trades in accordance with an embodiment of the present invention.

Once the order is accepted, trading system 405 determines if it can be completed according to associated execution conditions. FIG. 7 depicts an execution scenario in accordance with an embodiment of the present invention.

Upon acceptance of the order (step 700), the system scans the market to determine the updated market value of the underlying financial instrument (step 710) according to the market criteria specified in the order by user 400. Third party software programs that scan market data may be utilized in this step. Once the updated market value is determined, if the accepted price is not at least the predetermined distance away from the updated value as specified in the order, then the order is canceled (step 760). If the accepted price is at least the predetermined distance away from the updated value, then absent further execution conditions the order is completed (step 740). Trading system 740 may complete the order by, for example, executing the order itself or submitting the order to a third party system for execution.

If execution conditions were specified with the order (step 730), then trading system 405 completes the order if the execution conditions are satisfied (step 750). If the execution conditions are not satisfied, the order is canceled.

According to embodiments of the present invention, orders may not be completed, and users may not be notified of order acceptance and completion, until any and all associated activation and execution conditions are satisfied.

Listing 1 below illustrates hypothetical buy and sell orders as posted by trading system 405 in accordance with an embodiment of the present invention:

| Listing 1 Stock XYZ | | | |
|---|---|---|---|
| Reference | Amount | Price | Execution Condition |
| A | 400 | 80.02 | |
| B | 1,000 | 80.00 | |
| C | 1,200 | 79.99 | |
| D | 100,000 | 79.75 | B15 |
| E | 300 | 80.04 | |
| F | 800 | 80.07 | |
| G | 2,000 | 80.08 | |
| H | 75,000 | 80.20 | A15 |

For purposes of this listing, assume that the buy order marked by code identifier B15 is pegged to the current bid price of stock XYZ, and includes an execution condition requiring the bid price to remain unchanged for 15–45 seconds after a seller accepts the order (hence, the "B" in the code stands for pegging to the bid price and the "15" stands for the particular execution condition and corresponding time interval). Any code identifier may be found in a dictionary of definitions in trading system 405. Thus, order D represents that the buyer will buy 100,000 shares of stock XYZ if the bid price remains unchanged for 15–45 seconds after the initial matching of orders. This particular execution condition prevents gaming of the system (the exact time period need not be disclosed to either the buyer or seller). The seller sees the code identifier and accepts the execution condition B15 set forth by the buyer. Once the seller accepts to sell 100,000 shares of stock XYZ, neither the buyer nor the seller may cancel the order until the system executes the trade or cancels it.

On the other side, assume that the sell order marked by code identifier A15 is pegged to the current ask price of stock XYZ, and includes an execution condition requiring the ask price to remain unchanged for 15–45 seconds after a buyer accepts the order (hence, the "A" in the code stands for pegging to the ask price and the "15" stands for the particular execution condition and corresponding time interval). Thus, order H represents that the seller will sell 75,000 shares of stock XYZ if the ask price remains unchanged for 15–45 seconds after the initial matching of orders. Similarly, the buyer sees the code identifier and accepts the execution condition A15 set forth by the seller. Once the buyer accepts to buy 75,000 shares of stock XYZ, neither the buyer nor the seller may cancel the order until the system executes the trade or cancels it.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for trading below the market, comprising:
   receiving from a first party a buy order to trade a financial instrument at a predetermined distance below a market value of the financial instrument, the market value based on an established market value indicator;
   displaying the buy order via a user interface;
   receiving a selection of the displayed buy order by a second party at a particular price via the user interface, the selection indicating acceptance of the buy order by the second party at the particular price;
   determining by a computer, in response to the received selection, an updated market value of the financial instrument; and
   completing the order only if the accepted price is at least the predetermined distance below the updated market value.

2. The method of claim 1, wherein the financial instrument is one of a stock, bond, contract, option, future, commodity and currency.

3. The method of claim 1, wherein the predetermined distance is a percentage.

4. The method of claim 1, wherein the predetermined distance is a dollar amount.

5. The method of claim 1, wherein the established market value indicator is the NBBO (National Best Bid and Offer).

6. The method of claim 5, wherein the market value is based on the midpoint of a bid and ask price.

7. The method of claim 5, wherein the market value is based on a last trade price.

8. The method of claim 5, wherein the market value is based on a third party software program that scans market data.

9. The method of claim 1, wherein the second party accepts the buy order by clicking on a posting of the buy order over a network.

10. The method of claim 1, wherein completing the buy order includes executing the buy order at the accepted price.

11. The method of claim 1, wherein completing the buy order includes submitting the buy order to a third party system for execution at the accepted price.

12. The method of claim 1, further comprising:
receiving at least one activation condition with the buy order; and
delaying activation of the buy order until the at least one activation condition is satisfied.

13. The method of claim 12, wherein the at least one activation condition includes activating the buy order only if the market value of the financial instrument remains unchanged for a particular interval of time.

14. The method of claim 13, wherein the particular interval of time is 15 seconds.

15. The method of claim 12, wherein the at least one activation condition includes activating the buy order only on a one-minute up tick on a particular market index.

16. The method of claim 12, wherein the activation of the order comprises posting the order on a bulletin board transmitted over a network.

17. The method of claim 1, further comprising:
receiving at least one execution condition with the buy order; and
completing the buy order only if the at least one execution condition is satisfied.

18. The method of claim 17, wherein the at least one execution condition includes completing the buy order only if a particular market index increases during a particular interval of time after the buy order is accepted.

19. The method of claim 18, wherein the particular interval of time is one minute.

20. The method of claim 17, wherein the at least one execution condition includes completing the buy order only if the market value of the financial instrument remains unchanged for a particular interval of time.

21. The method of claim 20, wherein the particular interval of time is a random period between an upper and lower limit.

22. A computer-implemented method for trading above the market, comprising:
receiving from a first party a sell order to trade a financial instrument at a predetermined distance above a market value of the financial instrument, the market value based on an established market value indicator;
displaying the sell order via a user interface;
receiving a selection of the displayed sell order by a second party at a particular price via the user interface, the selection indicating acceptance of the sell order by the second party at the particular price;
determining by a computer, in response to the received selection, an updated market value of the financial instrument; and
completing the order only if the accepted price is at least the predetermined distance above the updated market value.

23. The method of claim 22, wherein the financial instrument is one of a stock, bond, contract, option, future, commodity and currency.

24. The method of claim 22, wherein the predetermined distance is a percentage.

25. The method of claim 22, wherein the predetermined distance is a dollar amount.

26. The method of claim 22, wherein the established market value indicator is the NBBO (National Best Bid and Offer).

27. The method of claim 22, wherein the market value is based on the midpoint of a bid and ask price.

28. The method of claim 22, wherein the market value is based on a third party software program that scans market data.

29. The method of claim 22, wherein the second party accepts the sell order by clicking on a posting of the sell order over a network.

30. The method of claim 22, further comprising:
receiving at least one activation condition with the sell order; and
delaying activation of the sell order until the at least one activation condition is satisfied.

31. The method of claim 30, wherein the at least one activation condition includes activating the sell order only if the market value of the financial instrument remains unchanged for a particular interval of time.

32. The method of claim 22, further comprising:
receiving at least one execution condition with the sell order; and
completing the sell order only if the at least one execution condition is satisfied.

33. The method of claim 30, wherein the at least one execution condition includes completing the sell order only if a particular market index increases during a particular interval of time after the sell order is accepted.

34. The method of claim 30, wherein the at least one execution condition includes completing the sell order only if the market value of the financial instrument remains unchanged for a particular interval of time.

35. The method of claim 33, wherein the particular interval of time is a random period between an upper and lower limit.

* * * * *